(12) United States Patent
Prettegiani

(10) Patent No.: US 7,729,360 B2
(45) Date of Patent: Jun. 1, 2010

(54) SWITCHING NETWORK

(75) Inventor: Stefano Prettegiani, Genoa (IT)

(73) Assignee: Ericsson AB, Stockholm (SE)

( * ) Notice: Subject to any disclaimer, the term of this patent is extended or adjusted under 35 U.S.C. 154(b) by 980 days.

(21) Appl. No.: 10/562,714

(22) PCT Filed: Jun. 22, 2004

(86) PCT No.: PCT/EP2004/051191

§ 371 (c)(1),
(2), (4) Date: Jun. 30, 2006

(87) PCT Pub. No.: WO2005/002276

PCT Pub. Date: Jan. 6, 2005

(65) Prior Publication Data

US 2007/0064688 A1    Mar. 22, 2007

(30) Foreign Application Priority Data

Jun. 26, 2003   (IT) .......................... MI2003A1309

(51) Int. Cl.
*H04L 12/56* (2006.01)

(52) U.S. Cl. .................. 370/400; 370/389; 370/429

(58) Field of Classification Search .............. 370/369, 370/370, 372, 375, 386, 388, 389, 400, 401, 370/428, 429, 535, 536, 371
See application file for complete search history.

(56) References Cited

U.S. PATENT DOCUMENTS

| 5,412,646 | A | | 5/1995 | Cyr et al. | |
|---|---|---|---|---|---|
| 5,754,120 | A | | 5/1998 | Argentati | |
| 5,987,027 | A | * | 11/1999 | Park et al. | 370/360 |
| 6,067,654 | A | | 5/2000 | Nakano et al. | |
| 6,198,558 | B1 | * | 3/2001 | Graves et al. | 398/135 |
| 6,333,932 | B1 | * | 12/2001 | Kobayasi et al. | 370/389 |
| 6,665,495 | B1 | * | 12/2003 | Miles et al. | 398/54 |
| 6,721,315 | B1 | * | 4/2004 | Xiong et al. | 370/389 |
| 6,920,131 | B2 | * | 7/2005 | Beshai | 370/380 |

(Continued)

FOREIGN PATENT DOCUMENTS

EP    1 001 648 A2    5/2000

OTHER PUBLICATIONS

Schrodi, K.. J., et al.,*Dynamic Connection Rearrangements in ATM Switching Networks*, Communications—Rising to the Heights., Denver, Jun. 23-26, 1991, Proceedings of the International Conference on Communications, New York, vol. 1, Jun. 23, 1991, pp. 1575-1581.

(Continued)

*Primary Examiner*—Chi H. Pham
*Assistant Examiner*—Kevin Mew
(74) *Attorney, Agent, or Firm*—Kirschstein, et al.

(57) ABSTRACT

A switching network forms part of a digital cross-connect for connecting data frames between requested inputs and outputs, and includes an input stage, an intermediate stage, and an output stage, each of which consists of a plurality of switching matrices. Each input stage switching matrix has a link to each intermediate stage switching matrix, and each intermediate stage switching matrix has a link to each output stage switching matrix. Individual time-slots of incoming data frames are independently routed through the switching matrices, reducing the possibility of blocking taking place.

17 Claims, 10 Drawing Sheets

U.S. PATENT DOCUMENTS

| | | | |
|---|---|---|---|
| 7,120,169 B2* | 10/2006 | Wolf et al. | 370/503 |
| 7,187,672 B1* | 3/2007 | Vishnu | 370/360 |
| 7,272,309 B1* | 9/2007 | Tamil et al. | 398/47 |
| 7,301,941 B2* | 11/2007 | Dally | 370/374 |
| 7,310,333 B1* | 12/2007 | Conklin et al. | 370/388 |
| 7,346,049 B2* | 3/2008 | Towles | 370/386 |
| 2001/0033584 A1* | 10/2001 | Dally | 370/503 |
| 2003/0002498 A1* | 1/2003 | Boulais et al. | 370/389 |
| 2003/0021267 A1* | 1/2003 | Wu et al. | 370/388 |
| 2003/0058848 A1* | 3/2003 | Dally | 370/360 |
| 2003/0214944 A1* | 11/2003 | Towles | 370/388 |
| 2005/0141804 A1* | 6/2005 | Yang et al. | 385/17 |

OTHER PUBLICATIONS

Takase, A., et al., *Datapath Architecture and Technology for Large Scale ATM Switching Systems*, Global Telecommunications Conference, 1996, Globecom '96, Communications: The Key to Global Prosperity, London, UK, Nov. 18-22, 1996, New York, pp. 1395-1399.

To, P.P., et al., *Tradeoff Between Pre-Switching Processing and Routing Network Complexity in ATM Packet Switches*, IEEE Globecome 1998, Globecom '98, The Bridge to Global Integration, Sydney, Nov. 8-12, 1998, IEEE Global Telecommunications Conference, New York, pp. 363-368.

\* cited by examiner

| Clos | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Out | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG 7A

| Clos | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 1 |
|---|---|---|---|---|---|---|---|---|---|---|---|---|---|---|---|---|---|---|---|---|---|---|---|---|---|---|---|---|---|---|---|---|---|---|---|---|
| Out | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

FIG 7B

| Clos | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 2 | 1 |
|---|---|---|---|---|---|---|---|---|---|---|---|---|---|---|---|---|---|---|---|---|---|---|---|---|---|---|---|---|---|---|---|---|---|---|---|---|
| Out | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

FIG 7C

| Clos | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|---|---|---|---|---|---|---|---|---|---|---|---|---|---|---|---|---|
| Out | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| In | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG 7D

| Clos | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Out | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 |
| In | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 |

FIG 7E

| Clos | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Out | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG 7F

| Clos | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 3 | 2 | 1 |
|---|---|---|---|---|---|---|---|---|---|---|---|---|---|---|---|---|---|---|---|---|---|---|---|---|---|---|---|---|---|---|---|---|---|---|---|---|
| Out | 1 | 1 | 1 | 1 | 1 | 1 | 1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 2 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |

FIG 7G

| Clos | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 3 | 2 | 1 |
|---|---|---|---|---|---|---|---|---|---|---|---|---|---|---|---|---|---|---|---|---|---|---|---|---|---|---|---|---|---|---|---|---|---|---|---|---|
| Out | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |

FIG 7H

| Clos | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 3 | 2 | 1 |
|---|---|---|---|---|---|---|---|---|---|---|---|---|---|---|---|---|---|---|---|---|---|---|---|---|---|---|---|---|---|---|---|---|---|---|---|---|
| Out | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| In | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |

FIG 7I

| Clos | 2 | 22 | 13 | 1 | 3 | 4 | 5 | 6 | 7 | 8 | 9 | 10 | 11 | 12 | 14 | 15 | 16 | 17 | 18 | 19 | 20 | 21 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| Out | 48 | 6 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| In | 48 | 3 | 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG 7J

SWITCHING NETWORK

This invention relates to a switching network for switching signals between inputs and outputs.

The invention particularly relates to switching networks forming part of digital cross-connects. Referring to FIG. 1, such digital cross-connects typically comprise a series of input modules A, a series of output modules B, and a switching network C linking them. The input modules receive, on various inputs, data streams in formats such as synchronous digital hierarchy (SDH), synchronous optical network (SONET), or optical transport network (OTN) format, and process those data streams (for example, detect and remove maintenance and signalling information), to create internal frames which are passed to the switching network C. Switching network C then routes the internal frames to the appropriate output, and the output modules B build the outgoing data streams eg SDH, SONET or OTN, by adding maintenance and signalling information.

A matrix-controller unit D forms part of the switching network C and is in charge of controlling switching behaviour and implementing the routing algorithm.

One known network for switching any of n inputs to any of m outputs is a multi-stage network that uses at least one intermediate stage to reduce the number of cross-points without increasing blocking, and is known as a Clos network after the technical paper published by Charles Clos in 1953.

A typical known Clos switching network is shown in FIG. 2. The first stage 1 has "a" switching matrices, each having "b" inputs and "c" outputs. The intermediate stage 2 has "c" switching matrices, each having "a" inputs and "a" outputs, and the output stage 3 has "a" switching matrices, each having "c" inputs and "b" outputs.

The outputs of each first stage 1 matrix are connected to the inputs of all the intermediate stage 2 matrices by only one link, and the outputs of each intermediate stage 2 matrix are connected to the inputs of all the output stage 3 matrices by only one link.

The fraction c/b is called the expansion factor, and is related to the number of matrix internal paths and therefore with the probability of finding a route from input to output of the switching network. If the term "b" equals or exceeds twice the term "a" minus 1, which approximates to the expansion factor being greater than or equal to 2, according to the theory of Clos switching networks it is possible to fill completely the outputs of the networks by always finding a path connecting any input with any output.

This invention is concerned with Clos switching networks, in which the expansion factor is less than 2 (it must be greater than unity, or a blocking situation could exist inside a single switching matrix), in order to provide an increased capacity by increasing the number of inputs and outputs, without unduly increasing the cost. However, this increases the risk of failing to find a path through the network, and makes it necessary to use a complex traffic status re-arrangement algorithm.

An example of how blocking could occur with an expansion ratio of less than 2 is illustrated with reference to FIG. 3, which shows a three-stage Clos network having nine matrices in each stage, although only one matrix is shown on the input and output stages. Each of the matrices on the input stage 4 has eight inputs by nine outputs, each on the intermediate stage 5 has nine inputs by nine outputs, and each on the output stage 6 has nine inputs by eight outputs. The expansion ratio is thus 9/8.

Consider an attempt to make a cross-connection between input 1 of the first matrix on the input stage 4 and output 1 on the first matrix of the output stage 6. Suppose that outputs 2 to 8 of the latter are used and fed by connections coming from the intermediate stage 5 matrices 3 to 9. Therefore the cross-connection can only be made only via intermediate stage 5 matrices 1 and 2, from the first matrix of the first stage 4. However, if outputs 1 and 2 of the first matrix of the input stage 4 (which connect to the first two matrices of the middle stage) are used by two connections going to any output stage matrix 8 apart from the first, the intended cross-connection cannot be made.

The invention is concerned with switching data frames at the different traffic levels defined by various digital standards, such as the SDH, the SONET or the OTN standard. Referring to FIG. 4, the basic SDH multiplexing structure is illustrated (Recommendation ITU-G.70X). The x3 on the link between the AU (Administrative Unit)-3 and AUG data frames indicates that the AUG data frame incorporates three AU-3 data frames. An STM (Synchronous Transport Module)-N frame may incorporate one AUG frame when N=1, and, say, 16 when N=16. Data frames are typically transmitted at 8000 frames per second, so the data rate for the larger frames is proportionately greater. The data rate for an STM-16 data frame is approximately equal to 2.5 Gbit/sec.

The input, output and internal links of the Clos network shown in FIG. 2 may thus accommodate a predetermined number of time slots, for example, 48 time slots corresponding to a 2.5 Gbit/sec. data rate. Each slot is always filled with stuffing or with valid data, in the last case, data that comes from a particular input to the switching network. A time slot can thus belong to any type of traffic. For example, it could be a third of a STM-1, a twelfth of a STM-4 etc., or may be unused, that is to say, filled with stuffing that is produced by the switching network itself.

It is known for such a Clos network to permit time division multiplexing (TDM) of data in its internal links, in addition to its space routing capability. Referring to FIG. 5, given a particular element 7 on input "x" of any particular switching matrix of the network of FIG. 2, the switching matrix 4 can move it to output "y" (space routing) and, inside the "y" stream, to a new time position (time-multiplexing).

The Applicants examined typical blocking situations in a Clos network switching digital data, and noted a good deal of fragmentation in the data filling the internal links. For example, some of the connection requests coming into the switching network were at a low data rate, such as STM-1, in which case three of the 48 time slots in the above example would be filled by valid data, and 45 would be filled by stuffing, leaving the links largely free but nevertheless unable to host another request, perhaps for STM-16.

The invention provides a switching network for switching frames of data, in defined time-slots, of a crossconnection request between a desired input and a desired output, comprising an input stage consisting of a plurality of switching matrices, an intermediate stage consisting of a plurality of switching matrices, and an output stage consisting of a plurality of switching matrices, each input stage switching matrix having a link to each intermediate stage switching matrix and each intermediate stage switching matrix having a link to each output stage switching matrix, including means for routing each time-slot of each frame independently through the switching matrices.

This permits better utilisation of internal links and correspondingly reduced blocking.

Advantageously, the expansion ratio (of outputs to inputs of the input stage switching matrices) is less than two, preferably less than 1.25 which would previously have been prone to Clos blocking.

Advantageously, the switching matrices have time division multiplex links. Each time slot may accommodate one frame whose nominal data rate is at least one sixteenth, preferably at least one forty-eighth, of the data rate of the links.

A switching matrix for switching frames of data, constructed in accordance with the invention, will now be described in detail, by way of example, with reference to the accompanying drawings, in which:

FIGS. 7A to 7I are diagrams showing the filling of the links to the intermediate stage switching matrices, and FIG. 7J is a diagram showing the filling of the links to the input stage switching matrices;

Figure 1:
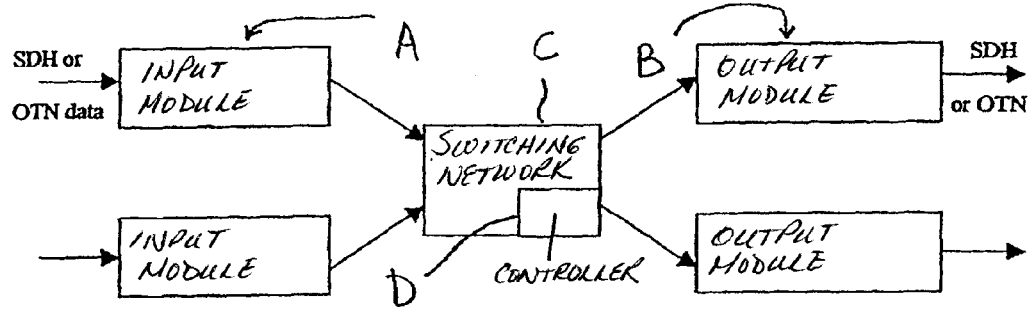
FIG. 1 is a block diagram showing a digital cross-connect incorporating a switching network, both as known, and in accordance with the invention.

Referring to FIG. 1, the switching network of the invention forms part of a digital cross-connect and, as with conventional cross-connects, includes a series of input modules A and output modules B, which remove and restore, respectively, maintenance and signalling information, to create internal frames which are routed through the switching network C. The internal frames are generated by the input modules A by replacing some bytes of the incoming SDH, SONET or OTN frames with information used by the switching network C or with stuffing. The removed bytes carry signalling information. The output modules B effect the inverse process: they replace those internally used bytes of the internal frame with information belonging to SDH, SONET or OTN standards.

The switching network of the invention also includes a matrix-controller unit D to control the switching behaviour and implement the routing algorithm in accordance with the invention.

Figure 6:
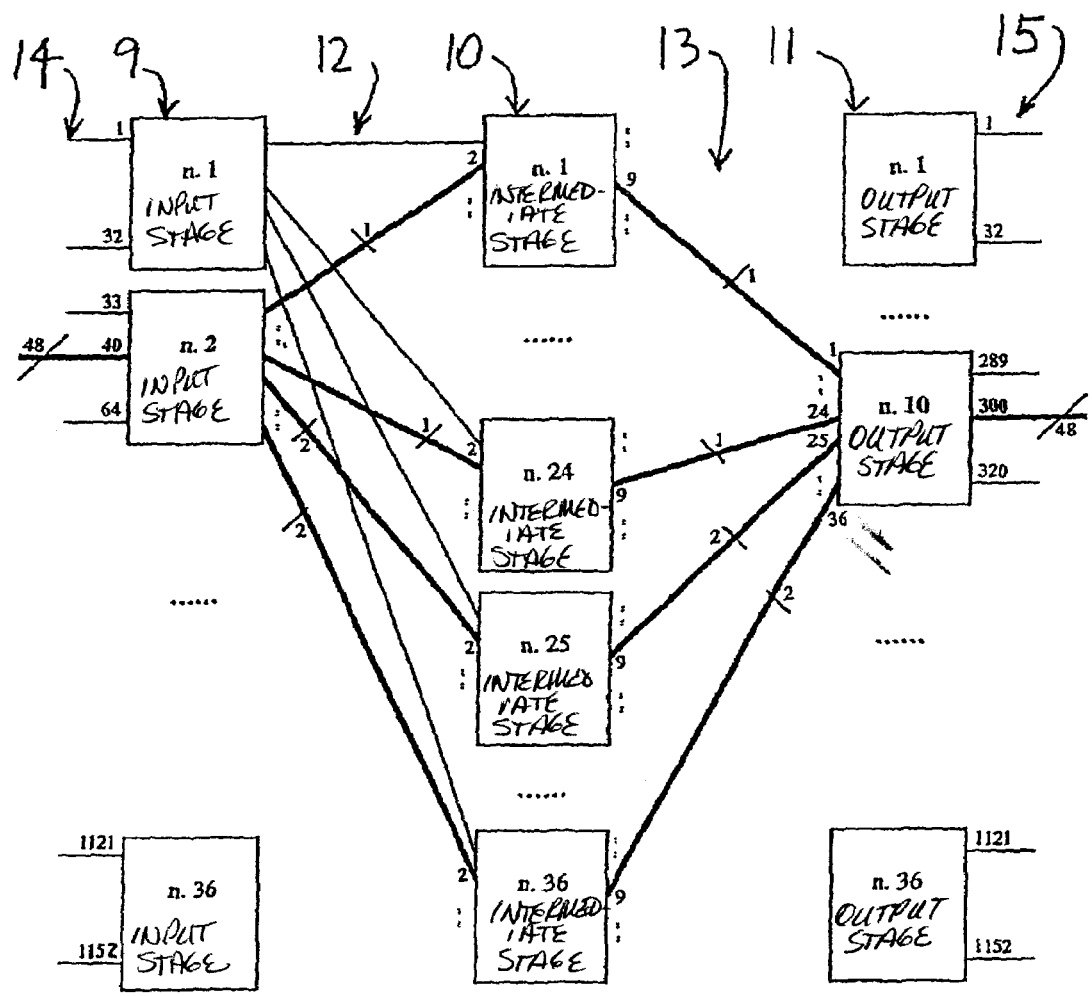
FIG. 6 is a block diagram depicting an example of the internal filling of a three-stage Clos switching network in accordance with the invention.

Referring to FIG. 6, the switching network of the invention will be described with reference to a three-stage Clos network receiving incoming traffic according to the SDH standard, in which there are 36 switching matrices in each of the input 9, intermediate 10, and output 11 stages. Those in the input stage have 32 inputs by 36 outputs, those in the intermediate stage have 36 inputs by 36 outputs, and those in the output stage have 36 inputs by 32 outputs. As with a conventional Clos network, each input stage 9 switching matrix has one, and only one, link, indicated generally by the reference 12, to each intermediate stage 10 switching matrix, and each intermediate stage 10 switching matrix has one, and only one, link, indicated generally by the reference 13, to each output stage 11 switching matrix. Links to the input and output of the switching network are indicated generally by the reference numerals 14,15.

The switching network is such that traffic travels from any input stage switching matrix to any intermediate stage switching matrix, and from any intermediate stage switching matrix to any output stage switching matrix, on a 2.5 Gbit/sec physical link. The signal on the links 12,13,14,15 is a Time Division Multiplexed signal made of 48 time slots. Each time slot has a bit rate of 2.5 Gbit/sec/48. This speed rate is the bit rate of an AU-3 type signal. Each slot is filled with stuffing, generated by the switching network, or valid data, which can be an entire AU-3 frame, a third of an STM-1 frame, a twelfth of an STM-4 frame, or a forty-eighth of an STM-16 frame.

Input to the switching network is in form of data frames at the different traffic levels according to the SDH standard. Each input link can accommodate all data frames equal or lower in bit rate to STM-16, that is to say, VC3, VC4, STM-1, STM-4, STM-16. Data frames of higher bit rate are accommodated on more input links. For example, an STM-64 is placed on four input links.

Figure 2:
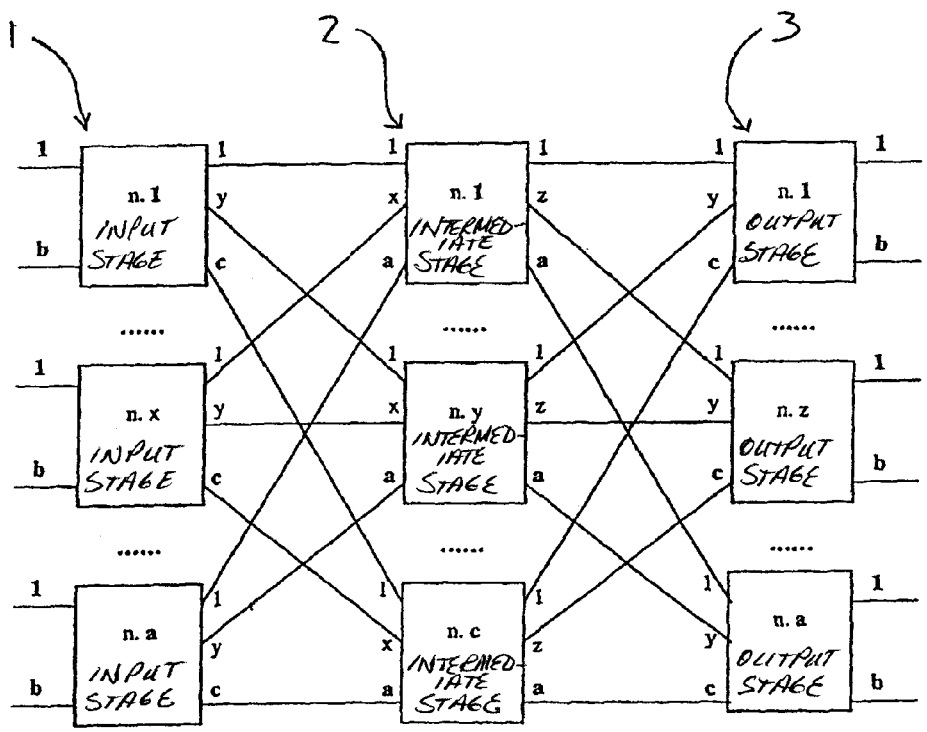
FIG. 2 is a block diagram of a three-stage Clos switching network, both as known, and in accordance with the invention.
Figure 5:
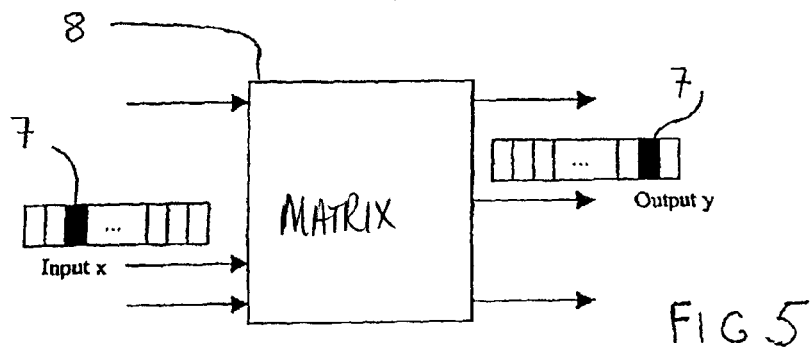
FIG. 5 is a block diagram depicting a switching operation of a switching matrix of the Clos switching network of FIG. 2.
Figure 3:
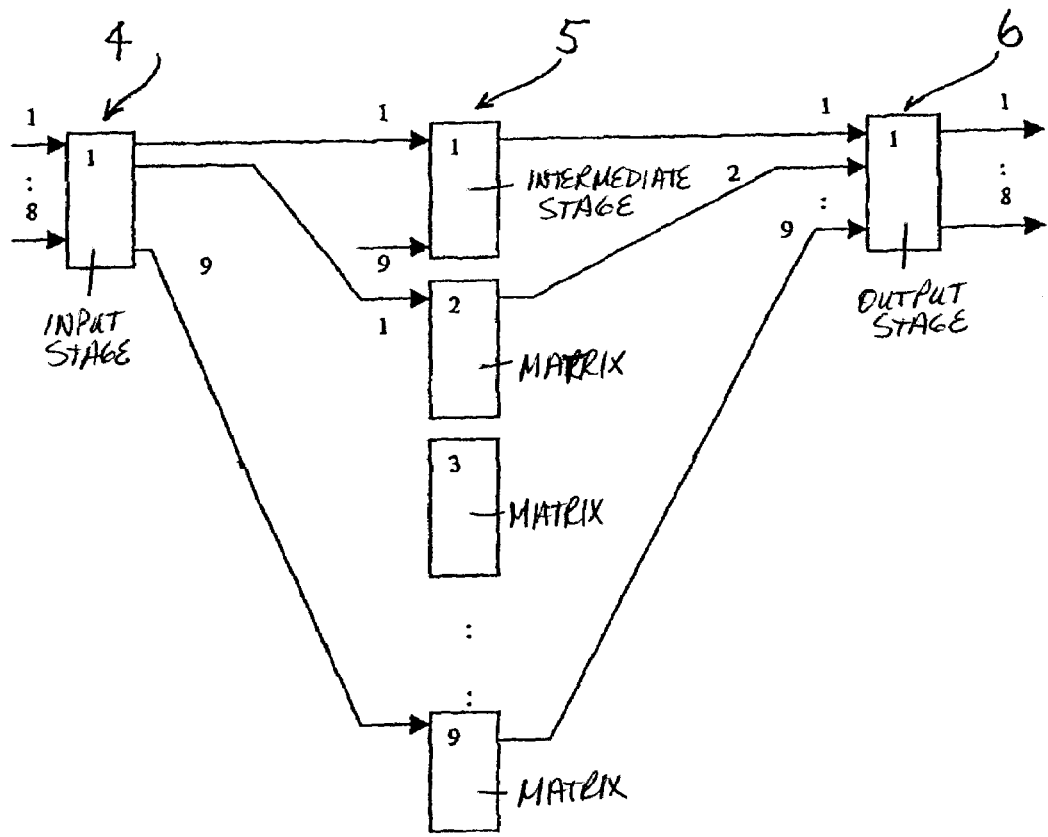
FIG. 3 is a block diagram of part of a particular example of a known Clos switching network showing a blocking situation.
Figure 4:
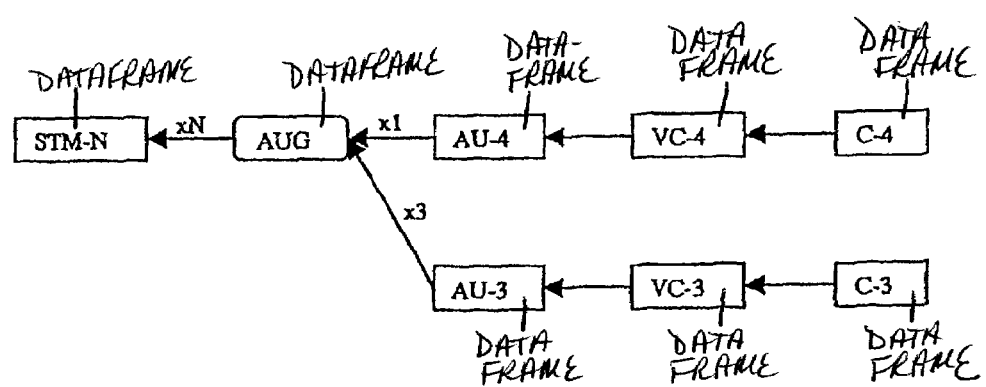
FIG. 4 is a diagram illustrating the structure of an STM SDH data frame.

The switching network would be prone to blocking for such traffic if the frames were routed as whole frames as in known switching network as in FIGS. 1 and 2, because the expansion ratio of the input stage switching matrices 9 is 9/8, considerably less than the Clos non-blocking expansion ratio of approximately 2.

Figure 8:
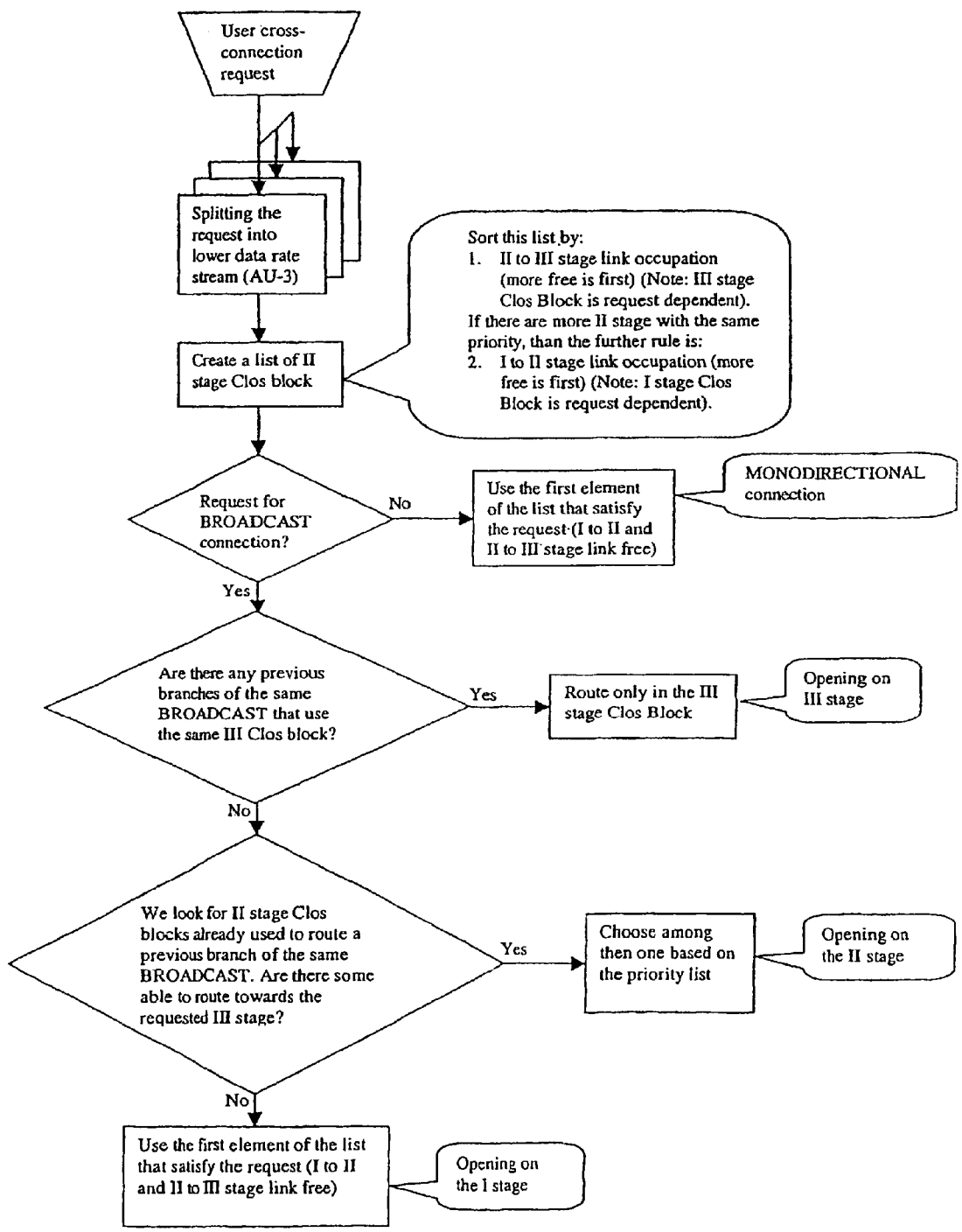
FIG. 8 is a flow-chart depicting the method of internal filling of the three-stage Clos network of FIG. 6.

In accordance with the invention, the matrix-controller unit D includes means for routing each time-slot of each frame independently through the switching matrices. Thus, referring to FIG. 8, when a user makes a cross-connection request, the request is split into AU-3 lower data rate streams consisting of individual time slots, each containing an AU-3 frame.

The next step performed by the matrix-controller unit D of the invention is the creation of a list of intermediate stage switching matrices, showing the occupation of the links, firstly, from the input switching matrix at which the request originated and, secondly, to the particular output switching matrix containing the requested output. The list is sorted, firstly, on the basis of the occupation of the links 13 between the intermediate stage switching matrices and the particular output stage switching matrix requested, the matrices corresponding to the links which have most time-slots free of valid data being first. If there is more than one link with an equal number of free time-slots, then the respective switching matrices are sorted, secondly, on the basis of the number of free time-slots in the links 12 to the input stage switching matrix at which the user cross-connection request was received. If there is more than one intermediate stage switching matrix with an equal number of free time-slots in the links 12, and an equal number of free time-slots in the links 13, for example, when all time-slots are free of valid data, then the switching matrices are listed on the basis of numerical order as seen in FIG. 6, or in some other predetermined order.

In the case of a request for a mono-directional connection, time-slots are allocated in the links 12,13 of the first intermediate stage switching matrix in the list, for the first AU-3 time-slot of the cross-connection request. Time-slots in the links 12,13 of the next intermediate stage switching matrix in the list are then allocated for the next AU-3 slot of the crossconnection request, and so on. Each time-slot is handled separately using the same algorithm.

A specific example is now given with reference to FIG. 6. Assume that there is no cross-connection across the switching network, so that all links 12,13 each have 48 time slots filled with stuffing. Assume further that a mono-directional connection for an STM-16 data frame from $40^{-th}$ input to $300^{-th}$ output is required. This means that it is necessary to interconnect the $8^{th}$ input on the $2^{nd}$ input stage switching matrix with the $12^{th}$ output of the $10^{th}$ output stage switching matrix.

The STM-16 connection request is dealt with as if it were 48 independent AU-3 mono-directional connection requests. Referring to FIG. 7A, the 36 columns relate to the intermediate stage switching matrices. The first row (Clos) is the number of the intermediate stage switching matrix, the second row is the AU-3 filling of the link between the specified intermediate stage switching matrix and the output stage switching matrix required, and the third row is the AU-3 filling of the link between the input stage switching matrix at which the request originated and the specified intermediate stage switching matrix. The AU-3 filling can be any number between 0 and 48. The algorithm creates such a list for any required connection.

The situation before the request is shown in FIG. 7A. The situation after having routed the first AU-3 is shown in FIG. 7B. The situation after having routed the second AU-3 is shown in FIG. 7C. After 36 AU-3 have been routed, all intermediate stage switching matrices (Clos) again have the same priority, as shown in FIG. 7D. After the last AU-3 has been routed, the ordered list is as shown in FIG. 7E.

A representation of this internal filling of the intermediate stage switching matrices is shown in FIG. 6. Any further request not involving the $2^{nd}$ input stage switching matrix and the $10^{th}$ output stage switching matrix will be routed in the same way.

Consider now a mono-directional connection from $5^{-th}$ VC(Virtual Container)-4 frame of $700^{-th}$ input to $2^{-nd}$ VC-4 of $307^{-th}$ output where the output stage switching matrix is the same as that of the previous request. From the switching network point of view this means that the 13, 14 and 15 AU-3 time slots of $28^{th}$ input of $22^{nd}$ input stage switching matrix must be connected to the 4, 5 and 6 AU-3 time-slots of the $19^{th}$ output of $10^{th}$ output stage stage switching matrix. The algorithm will deal this VC-4 connection like 3 independent AU-3 mono-directional connections.

Figure 9:
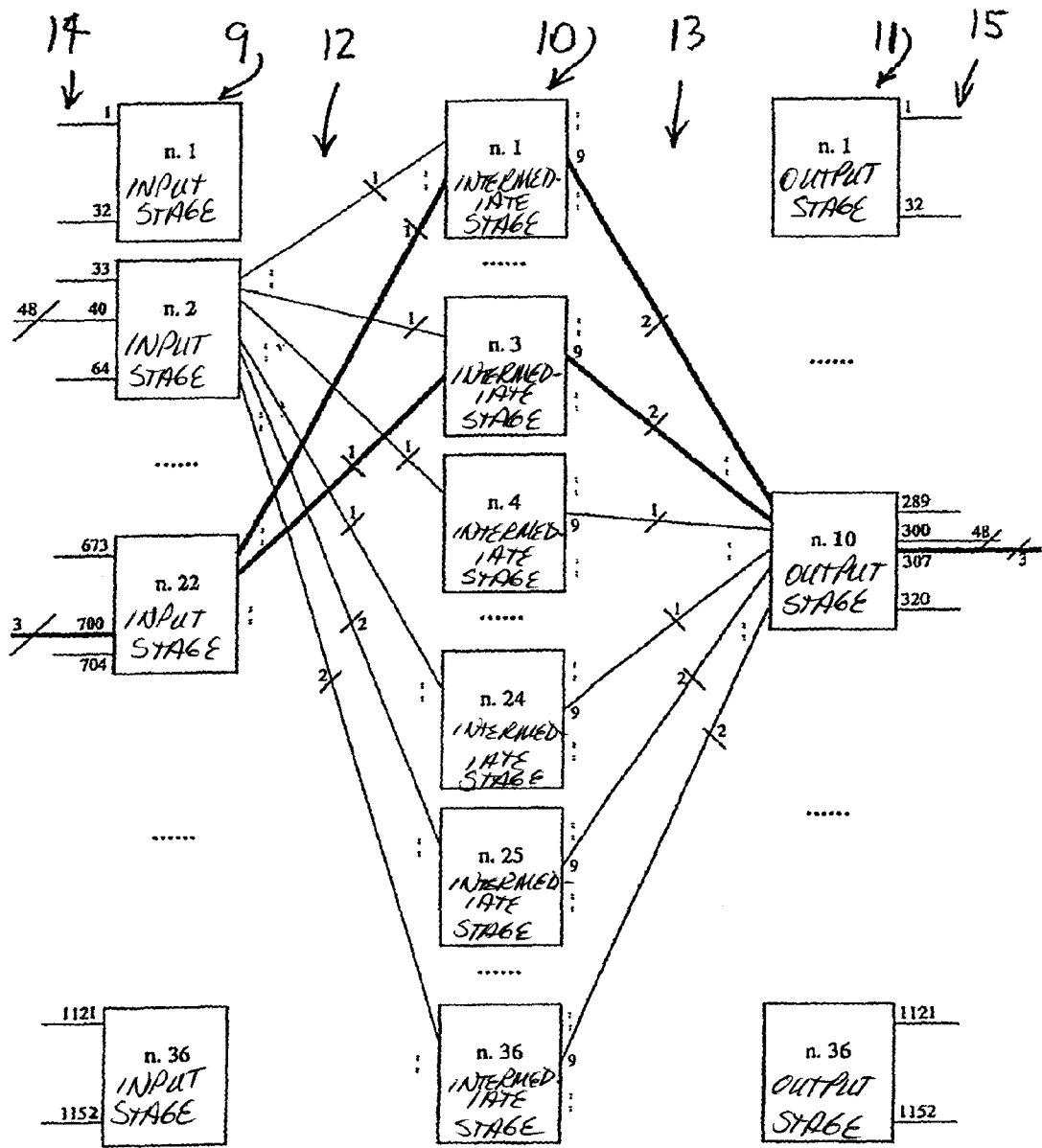
FIG. 9 is a block diagram of a further example of the internal filling of a three-stage Clos network in accordance with the invention.

The situation before the request is as shown in FIG. 7F. This list takes into account (see row 2 "Out") the filling of the links 13 resulting from the first connection. After the last AU-3, the ordered list is as shown in FIG. 7G. This new internal filling is shown in FIG. 9.

The internal links 12, 13 are TDM links with 48 slots available for data The individually-routed AU-3s will normally be fed to the first free slot in the respective link, irrespective of the position along the 48 slots. Thus, one particular AU-3 could be accommodated in the first TDM slot of one link The next AU-3 could be accommodated in the last TDM slot of the next link used, and a third AU-3 could be accommodated in a slot intermediate the ends of the row of 48 time-slots. The important thing is that the AU-3s are collected in order at the output of the respective output stage switching matrix.

Figure 10:
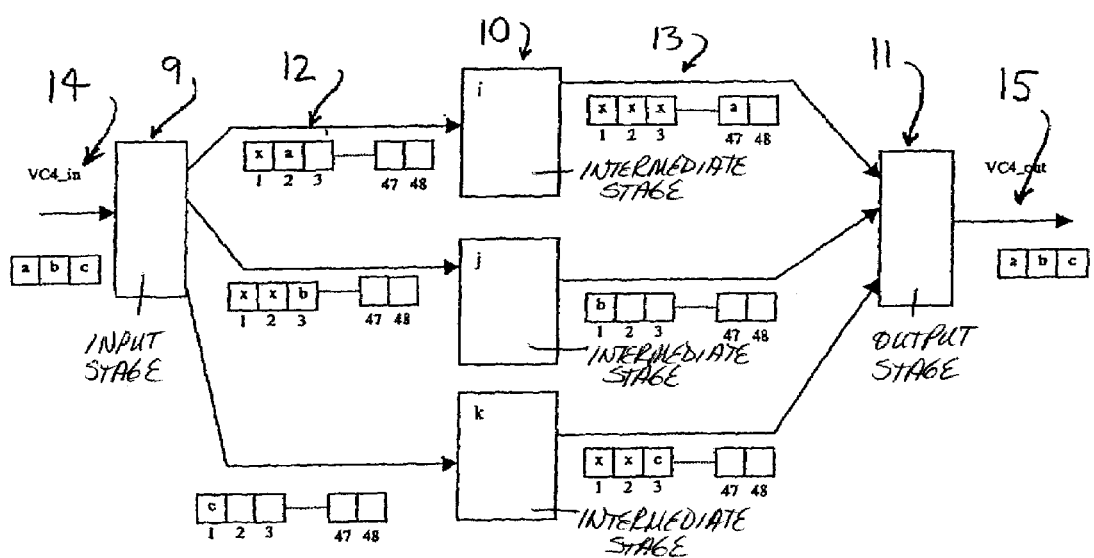
FIG. 10 is a block diagram showing the splitting and recombination of a data frame entering and leaving a three-stage Clos switching network in accordance with the invention.

Referring to FIG. 10, consider the routing of a VC4 frame (3 time slots equivalent to a repetitive sequence of three AU-3 bytes "a,b,c"). Matrix-controller unit D configures the input stage, intermediate stage and output stage Clos blocks in the way shown in the Figure. Busy time-slots, corresponding to other user requests, are denoted "x". The sequence of incoming bytes "a,b,c" is split on the input stage such that byte "a" goes to intermediate stage switching matrix i, byte "b" goes to intermediate stage switching matrix j, etc. The capability of every switching matrix to route a byte incoming on any time slot of a link to any time slot of any outgoing link is used. Byte "a" is carried within time slot 2 in links 12 and in time slot 47 in links 13, and so on for bytes "b" and "c". It is the respective output stage switching matrix stage 11 which maps again the correct VC4 structure by ordering "a,b,c" bytes in their correct order.

Among the key features of the switching network of the invention described above are: time-multiplexing (which is made possible by the switching matrix hardware); and the possibility of splitting any SONET, SDH or OTN traffic into AU-3 data stream level.

Input traffic to switching matrix can be seen as a set of AU-3 data frames no matter the real input traffic level to the digital cross-connect (for example, STM-1, STM-4, STM-16, etc. from SDH equipment, and STS-1, STS-3, etc. from SONET equipment).

All AU3 slots are routed in an independent way balancing the filling of intermediate stage switching matrices, first towards the outputs from the intermediate stage and second towards the inputs to the intermediate stage. This reduces or eliminates fragmentation because none of the links 12,13 is filled completely (i.e. not all time slots filled) before input/output saturation is reached.

Given a particular output stage switching matrix to be reached to satisfy a customer request, the algorithm chooses the intermediate stage switching matrices to use by balancing the filling (measured in number of time slots 0 to 48) of the links between them and that particular output stage switching matrix. Returning to the example above given with reference to FIG. 9, after having placed the second request—the VC4—a successive request, at any traffic level VC4 to STM256, that needs to reach output stage switching matrix no.10 will not use intermediate stage switching matrices nos.1, 2, 3, 25, 26, 27, 28, 29, . . . , 36 because the filling of their link to the output stage switching matrix no. 10 is equal to 2, and instead intermediate stage switching matrices nos. 4, 5, 6, . . . , 24 will be considered first since the filling of their link to the output stage switching matrix no. 10 is equal to 1.

Referring back to FIG. 8, a request for a broadcast connection, that is, a connection from an input to more than one output, is dealt with differently to a request for a mono-directional connection, that is, a request from one input to one output. In the case of the former, if there are already connections in place across the switching network relating to the broadcast request using the same output stage switching matrix, the connection is only routed in the output stage switching matrix which already carries the broadcast request. An input on such an output stage switching matrix is connected to two or more outputs instead of only one.

If there are not such connections in place using the same output stage switching matrix, the algorithm looks for intermediate stage switching matrices already used to route a previous branch of the same broadcast. If there are such intermediate stage switching matrices, the algorithm chooses between them based on the priority list referred to above, again, by connecting the inputs to those matrices to multiple outputs. If there are no such intermediate stage switching matrices in use, there is used the first path of the priority list that satisfies the request that the links 12 (input to intermediate) and 13 (intermediate to output) are free.

Figure 11:
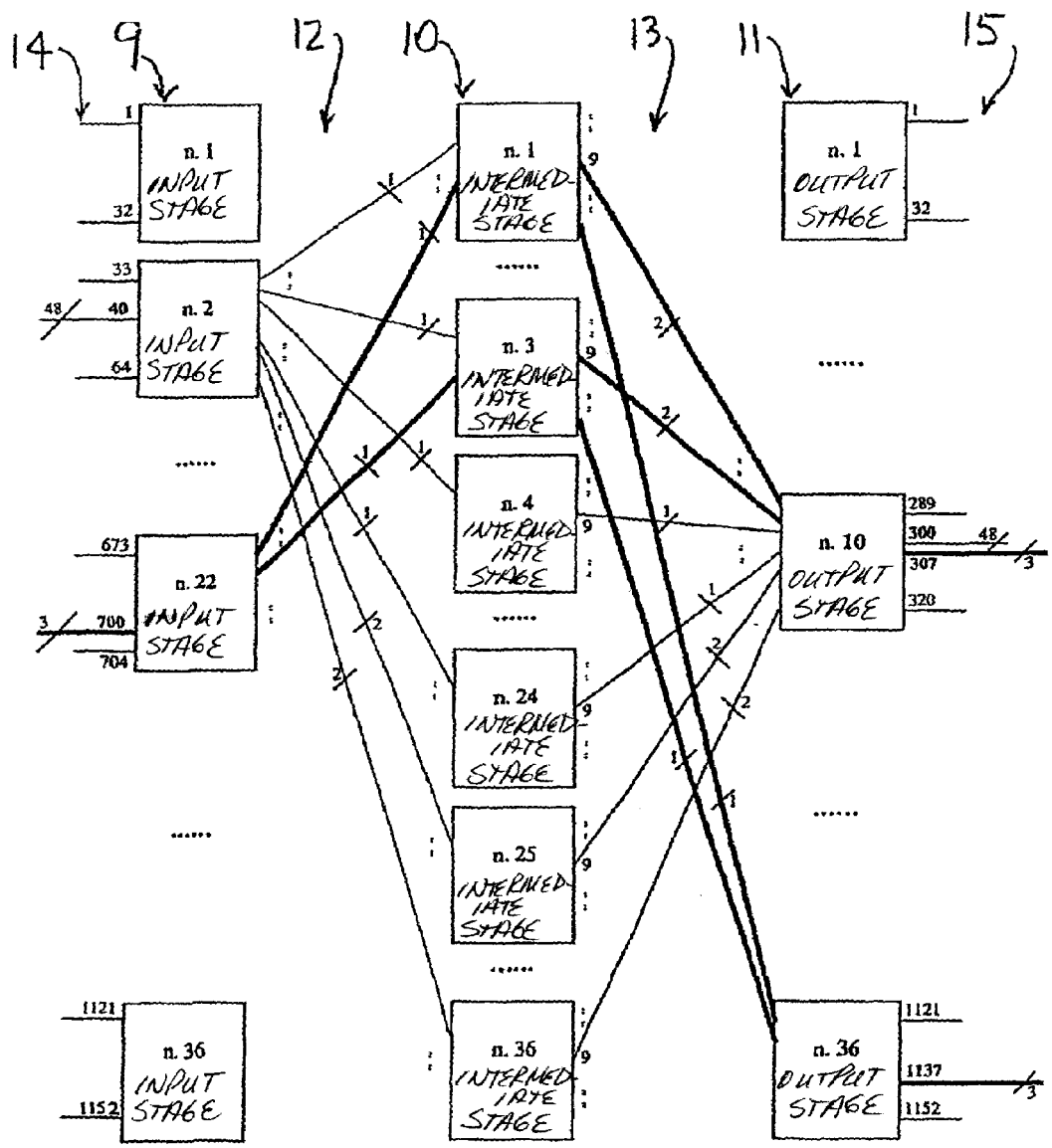
FIG. 11 is a block diagram showing a further example of internal filling of a three-stage Clos network in accordance with the invention.

To take an example, suppose the VC4 shown in FIG. 9 ($5^{-th}$ VC-4 of $700^{-th}$ input) also requires to be connected to the $14^{-th}$ VC-4 of $1137^{-th}$ output, changing a mono-directional connection to a broadcast connection. This is illustrated in FIG. 11. This new branch is not on the same output stage switching matrix (it is on 36th not $10^{th}$ stage), so the same output switching matrix cannot be used. As before, the 13, 14 and 15 AU-3 of $28^{th}$ input of $22^{nd}$ input stage switching matrix have to be connected, this time to the 40,41 and 42 AU-3 of the $27^{th}$ output of $36^{th}$ output stage switching matrix. As usual the algorithm will deal this VC-4 connection like 3 independent AU-3 connections.

The situation before the request for the additional connection required is shown in FIG. 7H. It should be noted that for each AU-3 there is already a path from the input to the intermediate stage due to the previous branch from the $5^{th}$ VC-4 of $700^{th}$ input (intermediate stage switching matrices 1-3), so the second branch on the intermediate stage can be opened simply by programming further links 13 from those switching matrices. When the last AU-3 is routed, the ordered list is as shown in FIG. 7I. Note that if the additional requested outgoing stream was on $10^{th}$ output stage switching matrix (outputs in the range: 289-320), the algorithm would have created the broadcast connection on the $10^{th}$ output stage switching matrix.

A computer simulation of the above described routing algorithm, has shown no blocking situation, and therefore no need to re-arrange. It is believed that the reason for this is the splitting of data traffic into AU-3 structures.

However, it is envisaged that blocking could take place in the event of hardware failure, such as of intermediate stage switching matrices. The algorithm does therefore include a re-arrangement strategy which takes account of just this situation.

Re-arrangement is a method of changing the internal matrix occupation while preserving the input/output status. One of the purposes is to produce a new internal status more suited than the old one to accommodate new paths; another is to reallocate internal paths avoiding intermediate stage switching matrices out of order. Re-arrangement is therefore an intelligent sequence, according to some strategy, of provisioning requests. Note that normal provisioning, driven by the customer, is, of course, a random sequence of provisioning requests.

Many different re-arrangement strategies were simulated all of them using the routing method before described, and all of them worked. To discriminate among them inputs 32 to 36 of the input stage switching matrices were considered. The re-arrangement strategies failed, but the one that was selected showed a better behaviour in terms of number of block situations solved.

The re-arrangement algorithm works as follows, referring to FIG. 12.

First every n-branch broadcast connection (only for broadcast connections which open on the input or intermediate stages) is considered as a series of n-mono-directional connections. Then every AU-3 component of each cross-connection is considered.

It is now necessary to determine which input stage switching matrix to start with for re-arrangement. For each input stage stage switching matrix, the sum of outgoing AU-3 s in use is calculated. A list of such matrices ordered according to this sum is calculated in descending order. If there is more then one input stage switching matrix with the same value, they are ordered by considering the sum of incoming AU-3 components in use in descending order.

Taking the first element of the list, all mono-directional connections (of this input stage switching matrix) are re-routed starting from the lowest input (using the normal routing algorithm). All broadcast connections (of this input stage switching matrix) are re-routed starting from the lowest input (using a modified routing algorithm). The modified routing algorithm chooses, first, the intermediate stage switching matrix that can accept the highest number of broadcast branches. If there are many such switching matrices, they are discriminated by taking in account the one with a lowest number of AU-3 in use. This operation is repeated until all the broadcast branches have been placed.

A specific re-arrangement example is now given. It is assumed that the input/output status is as follows:

STM-16 mono-directional connection from $40^{-th}$ input to $300^{-th}$ output; VC-4 broadcast connection from $5^{-th}$ VC-4 of $700^{-th}$ input to $2^{-nd}$ VC-4 of $307^{-th}$ output and to $14^{-th}$ VC-4 of $1137^{-th}$ output (as illustrated in FIG. 11); and, in addition, VC-4 mono-directional connection from $9^{-th}$ VC-4 of $390^{-th}$ input to $2^{-nd}$ VC-4 of $50^{-th}$ output.

The list showing input stage switching matrix output and input link AU-3 filling will be as shown in FIG. 7J. Switching matrix number 2 is considered first, and its mono-directional connection is re-routed (there is no broadcast connection). The next input stage switching matrix to be considered is number 22. There is no mono-directional connection so the two branches of the broadcast connection are re-routed. The last input stage switching matrix is number 13 where the mono-directional connection is routed.

Variations may be made without departing from the scope of the invention. Thus, instead of having a single intermediate stage between input and output stages, more than one, for example, tree stages may be included between the input and output stages.

The invention claimed is:

1. A switching network for switching frames of data, in defined time-slots, of a cross-connection request between a desired input and a desired output, comprising: an input stage having a plurality of switching matrices, an intermediate stage having a plurality of switching matrices, and an output stage having a plurality of switching matrices, each input stage switching matrix having a link to each intermediate stage switching matrix, and each intermediate stage switching matrix having a link to each output stage switching matrix, including a controller for routing each time-slot of each frame independently through the switching matrices, the routing controller being arranged to route each succeeding time-slot of the cross-connection request frame through the intermediate stage switching matrix having the link with the largest instantaneous number of free time-slots.

2. The switching network as claimed in claim 1, in which the links are between the intermediate stage switching matrix and the output stage switching matrix of the requested output.

3. The switching network as claimed in claim 2, in which the routing controller is arranged to route each succeeding time-slot through the intermediate stage switching matrix having the link from the input stage switching matrix at which the request was received with the largest instantaneous number of free time-slots, in the event that a plurality of intermediate stage switching matrices have equal instantaneous numbers of free time-slots in the links to the output stage switching matrices.

4. The switching network as claimed in claim 1, in which the routing controller is arranged to create a list of free time-slots in the links between the intermediate stage switching matrices and the input and output stage switching matrices of the request when the cross-connection request is received.

5. The switching network as claimed in claim 1, in which the links are time division multiplex links.

6. The switching network as claimed in claim 1, in which the number of intermediate stage switching matrices is at least two less than the sum of the number of inputs of each input stage switching matrix and outputs of each output stage switching matrix.

7. The switching network as claimed in claim 1, in which the number of intermediate stage switching matrices is less than twice the number of inputs of each input stage switching matrix.

8. The switching network as claimed in claim 7, in which the number of intermediate stage switching matrices is less than one and one half times the number of inputs of each input stage switching matrix.

9. The switching network as claimed in claim 1, in which the routing controller is arranged to reassemble the individually-routed time-slots into frames at the output of the output stage switching matrices.

10. The switching network as claimed in claim 1, in which the switching matrices are arranged to receive standard data traffic from which internally-generated frames replacing at least some overhead have been created.

11. The switching network as claimed in claim 1, in which each time-slot of the links corresponds to a frame having a data rate at least one sixteenth of that of the links.

12. The switching network as claimed in claim 11, in which the time-slots can each accommodate an AU-3 frame of the synchronous digital hierarchy standard.

13. A digital cross-connect, comprising: a switching network for switching frames of data, in defined time-slots, of a cross-connection request between a desired input and a desired output, the switching network including an input stage having a plurality of switching matrices, an intermediate stage having a plurality of switching matrices, and an output stage having a plurality of switching matrices, each input stage switching matrix having a link to each intermediate stage switching matrix, and each intermediate stage switching matrix having a link to each output stage switching matrix, including a controller for routing each time-slot of each frame independently through the switching matrices, the routing controller being arranged to route each succeeding time-slot of the cross-connection request frame through the intermediate stage switching matrix having the link with the largest instantaneous number of free time-slots.

14. A method of routing frames of data in defined time-slots through a switching network to fulfil a cross-connection request between a desired input and a desired output, wherein the switching network comprises an input stage having a plurality of switching matrices, an intermediate stage having a plurality of switching matrices, and an output stage having a plurality of switching matrices, each input stage switching matrix having a link to each intermediate stage switching matrix, and each intermediate stage switching matrix having a link to each output stage switching matrix, the method comprising the step of: routing each time-slot of each frame independently through the switching matrices by routing each succeeding time-slot of the cross-connection request frame through the intermediate stage switching matrix having the link with the largest instantaneous number of free time-slots.

15. The method as claimed in claim 14, in which the links are between the intermediate stage switching matrix and the output stage switching matrix of the requested output.

16. The method as claimed in claim 15, in which the routing step is performed by routing each succeeding time-slot through the intermediate stage switching matrix having the link from the input stage switching matrix at which the request was received with the largest instantaneous number of free time-slots, in the event that a plurality of intermediate stage switching matrices have equal instantaneous numbers of free time-slots in the links to the output stage switching matrices.

17. The method as claimed in claim 14, and the step of creating a list of free time-slots in the links between the intermediate stage switching matrices and the input and output stage switching matrices of the request when the cross-connection request is received.

* * * * *

UNITED STATES PATENT AND TRADEMARK OFFICE
CERTIFICATE OF CORRECTION

Figure 12:
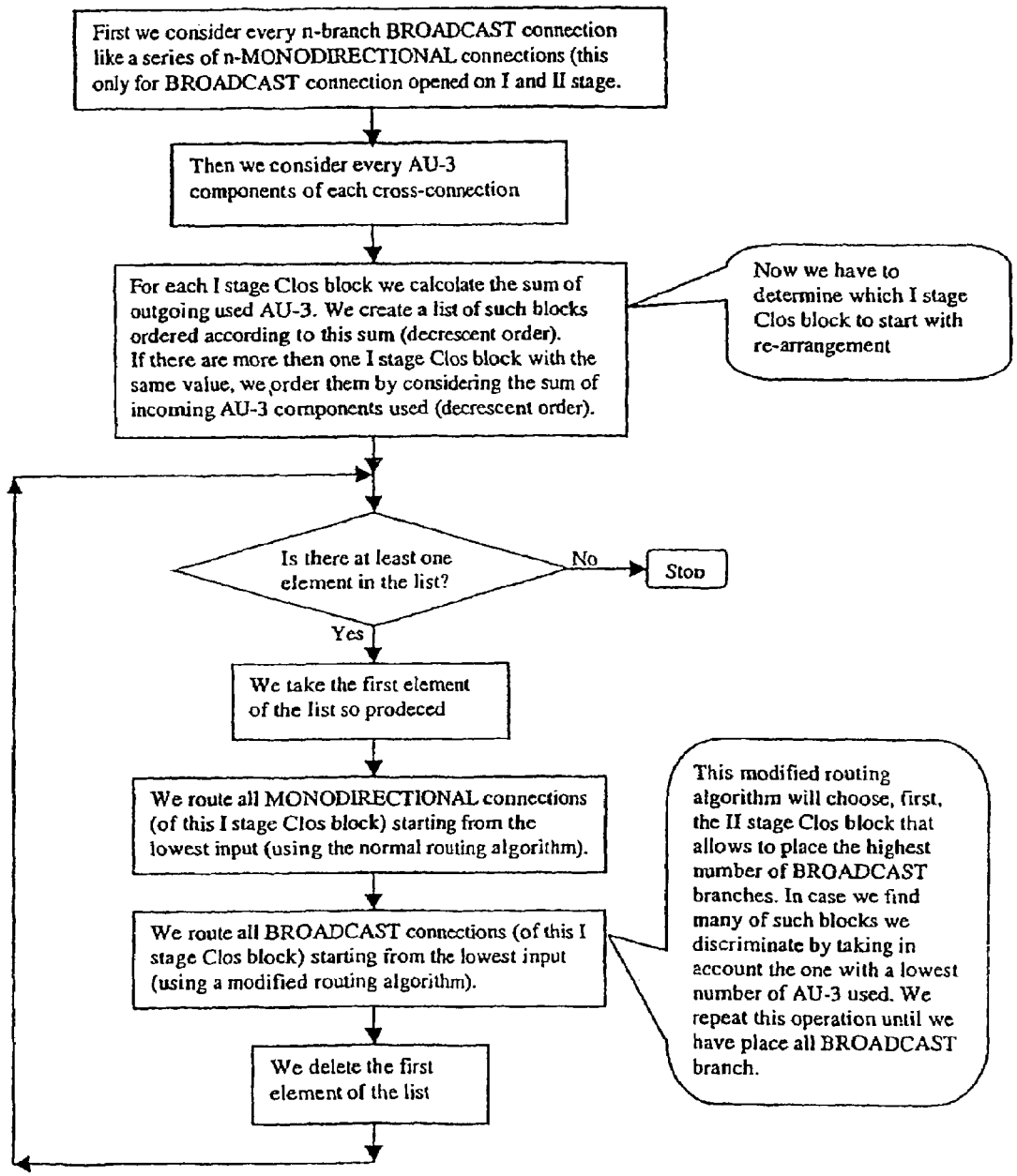
FIG. 12 is a flow-chart depicting a re-arrangement algorithm.

PATENT NO.        : 7,729,360 B2                                                Page 1 of 1
APPLICATION NO.   : 10/562714
DATED             : June 1, 2010
INVENTOR(S)       : Prettegiani It is certified that error appears in the above-identified patent and that said Letters Patent is hereby corrected as shown below:

In Fig. 12, Sheet 10 of 10, delete "  " and insert -- 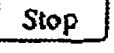 --, therefor.

In Column 5, Line 7, delete "$40^{-th}$ input to $300^{-th}$" and insert -- $40^{th}$ input to $300^{th}$ --, therefor.

In Column 5, Line 36, delete "$5^{-th}$" and insert -- $5^{th}$ --, therefor.

In Column 5, Lines 37-38, delete "$700^{-th}$ input to $2^{-nd}$ VC-4 of $307^{-th}$" and insert -- $700^{th}$ input to $2^{nd}$ VC-4 of $307^{th}$ --, therefor.

In Column 5, Line 52, delete "data" and insert -- data. --, therefor.

Signed and Sealed this

Sixteenth Day of November, 2010

David J. Kappos
*Director of the United States Patent and Trademark Office*